US009696733B2

(12) United States Patent
Eichelhardt et al.

(10) Patent No.: US 9,696,733 B2
(45) Date of Patent: Jul. 4, 2017

(54) METHOD FOR REGULATING THE SPEED OF A CLAMPING AND LIFTING APPARATUS

(71) Applicant: SIEMAG TECBERG GmbH, Haiger (DE)

(72) Inventors: Peter Eichelhardt, Haiger (DE); Viktor Refenius, Haiger (DE); Nico Stadtbaeumer, Haiger (DE)

(73) Assignee: SIEMAG TECBERG GmbH, Haiger (DE)

(*) Notice: Subject to any disclaimer, the term of this patent is extended or adjusted under 35 U.S.C. 154(b) by 0 days.

(21) Appl. No.: 14/786,939

(22) PCT Filed: Apr. 25, 2014

(86) PCT No.: PCT/EP2014/058491
§ 371 (c)(1),
(2) Date: Oct. 23, 2015

(87) PCT Pub. No.: WO2014/174095
PCT Pub. Date: Oct. 30, 2014

(65) Prior Publication Data
US 2016/0083227 A1 Mar. 24, 2016

(30) Foreign Application Priority Data
Apr. 26, 2013 (DE) .......................... 10 2013 007 292

(51) Int. Cl.
*G05D 16/20* (2006.01)
*B66D 1/44* (2006.01)
(Continued)

(52) U.S. Cl.
CPC ......... *G05D 16/2073* (2013.01); *B66B 15/04* (2013.01); *B66B 19/02* (2013.01);
(Continued)

(58) Field of Classification Search
CPC ...... B66D 1/44; B66D 3/006; G05D 16/2073; G05D 16/2066; B66B 15/04
See application file for complete search history.

(56) References Cited

U.S. PATENT DOCUMENTS 3,868,850 A * 3/1975 Davison ................. F16G 11/12
254/29 A
4,274,618 A 6/1981 Orr
(Continued)

FOREIGN PATENT DOCUMENTS

CN 102616660 A 8/2012
DE 3348124 C2 5/1988
(Continued)

OTHER PUBLICATIONS

"DL-P40 Release 3.029.xx Computer Control System-Operation and Maintenance Manual"; pp. 1-54; Published Jan. 3, 2012; Dorman Long Technology Ltd.*
(Continued)

*Primary Examiner* — Thomas Randazzo
(74) *Attorney, Agent, or Firm* — 24IP Law Group; Timothy R DeWitt

(57) ABSTRACT

A method for regulating the speed of a clamping and lifting device (1) with at least one guide cylinder (2). A hydraulic fluid can flow in and out through in each case one opening in at least two cylinder chambers of the at least one guide cylinder (2) via at least one pump device and via at least one valve device per cylinder chamber for lifting and lowering loads (16). The degree of opening of the valve of the at least one valve device in each case can be changed as a function of the working direction of the device (1), a setpoint speed (10) and the current speed (11) of the at least one guide cylinder (2).

14 Claims, 3 Drawing Sheets

(51) Int. Cl.
  *B66D 3/00*   (2006.01)
  *B66D 1/40*   (2006.01)
  *B66B 15/04*  (2006.01)
  *B66B 19/02*  (2006.01)

(52) U.S. Cl.
  CPC ............... *B66D 1/40* (2013.01); *B66D 1/44* (2013.01); *B66D 3/006* (2013.01); *G05D 16/2066* (2013.01)

(56) References Cited

U.S. PATENT DOCUMENTS

| | | | |
|---|---|---|---|
| 4,454,633 A * | 6/1984 | de la Fuente | E04G 21/121 24/115 R |
| 4,884,402 A | 12/1989 | Strenzke et al. | |
| 5,844,390 A | 12/1998 | Cameron | |
| 5,947,140 A | 9/1999 | Aardema et al. | |
| 5,967,582 A * | 10/1999 | Saito | B66C 1/442 294/110.1 |
| 6,718,759 B1 * | 4/2004 | Tabor | E02F 9/2221 60/368 |
| 6,775,974 B2 * | 8/2004 | Tabor | F15B 9/09 60/422 |
| 6,880,332 B2 * | 4/2005 | Pfaff | F15B 11/006 60/422 |
| 7,130,721 B2 * | 10/2006 | Wear | G05D 16/2073 700/282 |
| 7,377,398 B2 * | 5/2008 | Lichinchi | B60P 1/5471 104/126 |
| 7,380,398 B2 * | 6/2008 | Pfaff | F15B 11/006 60/327 |
| 2014/0314478 A1 * | 10/2014 | Schubert | B66B 5/0087 403/409.1 |
| 2016/0207736 A1 * | 7/2016 | Zhu | B66B 7/10 |

FOREIGN PATENT DOCUMENTS

| | | |
|---|---|---|
| DE | 4322970 A1 | 1/1995 |
| DE | 4430058 B4 | 7/2005 |
| DE | 10340506 B4 | 5/2006 |
| DE | 10245346 B4 | 1/2012 |

OTHER PUBLICATIONS

Dorman Long Technology Ltd. "DL-P40 Release 3.029xx Computer Control System".

* cited by examiner

METHOD FOR REGULATING THE SPEED OF A CLAMPING AND LIFTING APPARATUS

BACKGROUND OF THE INVENTION

Field of the Invention

The present invention relates to a method for regulating the speed of a clamping and lifting apparatus.

Brief Description of the Related Art

It is a known approach to use clamping and lifting apparatus on single-rope and multi-rope Koepe hoisting installations. Such an apparatus can simultaneously clamp and hold, lift or lower all ropes of a cageway without complex preparations. Hydraulically operated clamping cylinders open and close the clamps to such a degree that initial clamping is achieved securely. The clamping devices are arranged on two clamping bars, the lower one of which is configured to be stationary and the upper one of which is configured to be mobile. The upper clamping bar is moved by means of lifting cylinders and is thus responsible for lifting and lowering the ropes. During the idle strokes of the upper clamping bar, the ropes are supported in the lower clamping bar, in contrast.

In the state of the art so far, the hydraulic oil feed and discharge of the master lifting cylinder is controlled by a valve activated with a permanently preset voltage value (0-10 V corresponding to the valve deflection 0-100%). The other lifting cylinders are guided with a position-based slave regulation. The fed and discharged volume flow of the hydraulic oil is controlled thereby. Since the fed and discharged volume flow is dependent on the load, however, it is not possible in the hitherto state of the art to directly specify how fast the clamping and lifting apparatus is actually moving and whether a sufficient amount of hydraulic oil can be replenished in the individual lifting cylinders. When the load direction is opposite to gravity (load towards the top) for example, the speed of the lifting cylinders is too high, since the load presses the hydraulic oil out of the upper side of the lifting cylinder too fast. Since the permanently preset voltage value which is based on a load-free case for controlling the valve cannot be adjusted variably, the pumps cannot replenish sufficient hydraulic oil on the lower side of the lifting cylinder, since these are configured only for the required amount of hydraulic oil for the projected speed of the lifting cylinders. When the volume of hydraulic oil required in the lifting cylinder chambers exceeds the volume actually provided by the pumps, the pressure in the lifting cylinder chambers breaks down, and, in dependence on whether the journey is upward or downward with load, a vacuum is formed in the corresponding cylinder chamber. The consequence is that the configuration so far contributes to operating the clamping and lifting apparatus on single-rope and multi-rope Koepe hoisting installations in critical operational states. Further, the configuration so far does not offer the possibility of recognizing occurring failures at an early stage, and of initiating corresponding counter-measures before critical operational states can actually occur.

SUMMARY OF THE INVENTION

It is consequently the object of the present invention to prevent critical operational states of the clamping and lifting apparatus on single-rope and multi-rope Koepe hoisting installations and to remedy the disadvantages of the known state of the art.

This object is achieved by a method for regulating the speed of a clamping and lifting apparatus according to the features of the independent claim 1 and by means of a regulation apparatus according to the features of the independent claim 8, wherein expedient embodiments are described by the features of the respective dependent claims.

The invention relates to a method for regulating the speed of a clamping and lifting apparatus with at least one master cylinder. A hydraulic fluid can be fed and discharged through respectively one opening in at least two cylinder chambers of the at least one master cylinder via at least one pumping device and via at least one valve device per cylinder chamber for lifting and lowering loads. In accordance with the invention, the degree of valve opening of the at least one valve device can be changed in dependence on the working direction of the apparatus, a target speed and the current speed of the at least one master cylinder. The method preferably changes the degree of valve opening in such a fashion that, in dependence on the current speed of the at least one master cylinder and a target speed, a sufficient amount of hydraulic fluid depending on the working direction of the apparatus can be replenished in the corresponding cylinder chamber. By this method in the described fashion, the volume of hydraulic fluid required in the cylinder chambers can be provided at any given time, such that the pressure in the cylinder chambers does not break down at any time, and no vacuum can be formed in the corresponding cylinder chamber depending on whether the journey is upward or downward with load. The advantage of the method is that the clamping and lifting apparatus can be operated on single-rope and multi-rope Koepe hoisting installations outside critical operational states. This leads to a higher efficiency of the installation, a greater service life and increased operational reliability.

Preferably, the valve device of the cylinder chamber being filled is opened. When the current speed of the master cylinder deviates from the target speed, the degree of valve opening of the valve device of the cylinder chamber being emptied is changed, wherein the degree of valve opening of the valve device of the cylinder chamber being filled is coupled to the degree of valve opening of the valve device of the cylinder chamber being emptied. By these method steps, the current speed of the master cylinder in the clamping and lifting apparatus can be determined at any given time in the load-dependent case. By the constant alignment of the current speed of the master cylinder with a target speed, the degree of valve opening can so be changed at an early stage upon corresponding deviation that a sufficient amount of hydraulic fluid can be replenished in the corresponding cylinder chamber. By these method steps, counter-measures are taken in order to prevent critical operational states of the clamping and lifting apparatus on single-rope and multi-rope Koepe hoisting installations. Further, by this method the clamping and lifting apparatus can be moved at a constant speed independently of the load direction and/or movement direction.

The method for speed regulation in a clamping and lifting apparatus can further comprise a readjustment. The clamping and lifting apparatus comprises, besides the at least one master cylinder, further at least one slave cylinder. For readjustment of the at least one slave cylinder with reference to the at least one master cylinder, the hydraulic fluid can be fed and discharged through respectively one opening in at least two cylinder chambers of the at least one slave cylinder via the at least one pumping device and via at least one further valve device per cylinder chamber for lifting and lowering loads. The degree of valve opening of the at least one further valve device can be changed in dependence on the absolute movement position of the at least one master cylinder and the current movement position of the at least one slave cylinder. By the readjustment of the at least one slave cylinder with reference to the at least one master cylinder in the above-described fashion, the absolute movement position of all present cylinders in the clamping and lifting apparatus is kept equal. Consequently, the upper clamping bar of the clamping and lifting apparatus can be kept in balance.

Preferably, the method for readjusting the at least one slave cylinder can further comprise the determination of the absolute movement position of the at least one master cylinder and the determination of the current movement position of the at least one slave cylinder. In so doing, the absolute movement position of the at least one master cylinder is compared to the current movement position of the at least one slave cylinder. Preferably, the valve device of the cylinder chamber being filled of the at least one slave cylinder is opened. When the current movement position of the at least one slave cylinder deviates from the absolute movement position of the at least one master cylinder, the degree of valve opening of the at least one further valve device of the cylinder chamber being emptied of the at least one slave cylinder is changed, wherein the degree of valve opening of the at least one further valve device of the cylinder chamber being filled is coupled to the degree of valve opening of the at least one further valve device of the cylinder chamber being emptied. By these method steps a deviation of movement position of the at least one slave cylinder with reference to the at least one master cylinder is recognized at an early stage. Further, the degree of valve opening of the at least one further valve device of the cylinder chamber being emptied of the at least one slave cylinder is changed such that the absolute movement position of all cylinders present in the clamping and lifting apparatus is kept equal. Consequently, the upper clamping bar of the clamping and lifting apparatus can be kept in balance, and the clamping and lifting apparatus can be moved at constant speed independently of the load direction and/or movement direction.

The method for speed regulation can preferably further comprise the determination of the current speed of the at least one master cylinder by means of a travel measuring system. The current speed of the at least one master cylinder is determined on the basis of the travel change of the travel measuring system over the movement time. Thereby a precise measurement of the current speed of the at least one master cylinder is made available, while mounting and maintenance are simple.

In a preferred embodiment, the method can further comprise the determination of the current pressure value in the at least two cylinder chambers of the at least one master cylinder and/or of the at least one slave cylinder. In so doing, the current pressure value is compared to a target pressure value. Consequently, the clamping and lifting apparatus can be monitored without additional security measures, and can likewise trigger corresponding safety measures when the pressures deviate exceedingly strongly. The operational reliability of the installation is additionally increased thereby.

In this embodiment the current pressure value is determined with the aid of at least one pressure switch, with a digital switching point and an analog output value. Thereby, the advantages with regard to accuracy, service life and functionality of the pressure switch are given, and a quick and simple adjustment is possible.

The invention further relates to a regulation apparatus for effecting a method with the above-mentioned method features, wherein the regulation apparatus for regulating the speed of a clamping and lifting apparatus with at least one master cylinder can comprise at least one speed sensor element, in order to determine the current speed of the at least one master cylinder. The regulation apparatus can further comprise at least one controller in order to compare the current speed of the at least one master cylinder with a target speed. The regulation apparatus preferably additionally comprises at least one actuator motor, in order to change the degree of valve opening of the at least one valve device per cylinder chamber of the at least one master cylinder upon deviation of the current speed of the at least one master cylinder from the target speed.

By changing the degree of valve opening of the at least one valve device per cylinder chamber of the at least one master cylinder upon deviation of the current speed of the at least one master cylinder from the target speed, the regulation apparatus can automatically prevent critical operational states of the clamping and lifting apparatus. The operation of the clamping and lifting apparatus outside critical operational states leads to a higher efficiency of the installation, a longer service life and an increased operational reliability.

In a preferred embodiment the regulation apparatus, for adjusting at least one slave cylinder with reference to the at least one master cylinder in a clamping and lifting apparatus, can comprise at least one position sensor element in order to determine the current movement position of the at least one slave cylinder. The regulation apparatus can further comprise at least one further controller in order to compare the absolute movement position of the at least one master cylinder to the current movement position of the at least one slave cylinder. The regulation apparatus preferably comprises at least one further actuator motor in order to change the degree of valve opening of the at least one valve apparatus per cylinder chamber of the at least one slave cylinder upon deviation of the current movement position of the at least one slave cylinder from the absolute movement position of the at least one master cylinder. By this regulation apparatus a deviation of movement position of the at least one slave cylinder with reference to the at least one master cylinder is recognized at an early stage. Further, the degree of valve opening of the at least one further valve device per cylinder chamber of the at least one slave cylinder is changed such that the absolute movement position of all cylinders present in the clamping and lifting apparatus is kept equal. Consequently, the upper clamping bar of the clamping and lifting apparatus can be kept in balance, and the clamping and lifting apparatus can be moved at constant speed independently of the load direction and/or movement direction.

In the regulation apparatus preferably the at least one speed sensor element can be configured as a travel measuring system, wherein the current speed of the at least one master cylinder is determined on the basis of the change of travel of the travel measuring system over the movement time. Thereby a precise measurement of the current speed and a precise measurement of the absolute movement position of the at least one master cylinder are made available, while mounting and maintenance are simple.

In a preferred embodiment of the regulation apparatus the at least one position sensor element can be configured as a position measuring system in each case. Thereby an accurate measurement of the current movement position of the at least one slave cylinder is made available, while mounting and maintenance are simple.

Further preferably, it is provided that the at least one controller of the regulation apparatus is configured as at least one PI controller. This ensures a very rapid reaction time with exact control.

In a preferred embodiment the regulation apparatus can comprise at least one pressure sensor element, in order to determine the current pressure value in the at least two cylinder chambers of the at least one master cylinder and/or of the at least one slave cylinder. Thereby the operational reliability of the installation is additionally increased.

In the regulation apparatus preferably the at least one pressure sensor element can be configured as a pressure switch, wherein the pressure value is determined with a digital switching point and an analog output value. Thereby the advantages with regard to accuracy, service life and functionality of the pressure switch are given, and quick and simple adjustment is possible.

Further, the regulation apparatus can comprise at least one pressure controller, in order to compare the current pressure value in the at least one master cylinder and/or in the at least one slave cylinder to a target pressure value. Consequently, the clamping and lifting apparatus can be monitored by an additional protection device and corresponding safety measures can be triggered likewise when pressures deviate exceedingly strongly. Thereby the operational reliability of the installation is additionally increased.

BRIEF DESCRIPTION OF THE DRAWINGS

Further characteristics and advantages of the invention result from the following, purely demonstrative and in no way limiting description of various embodiments of the invention with reference to the attached drawings. In particular, the characteristics of the various embodiments can also be mutually combined. In the attached drawings there is shown respectively.

DETAILED DESCRIPTION OF THE PREFERRED EMBODIMENTS

Figure 1:
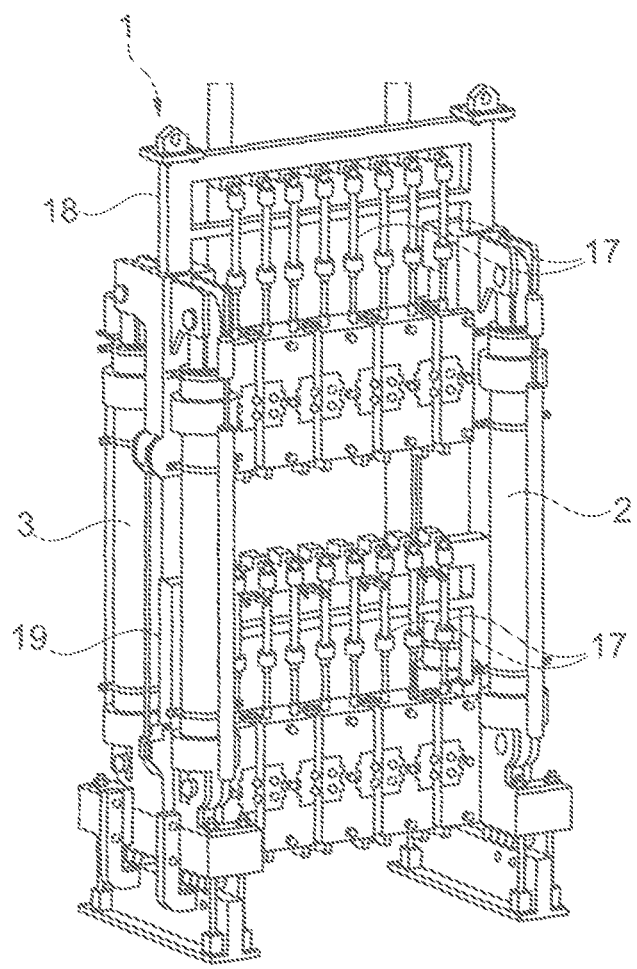
FIG. 1 a clamping and lifting apparatus.

FIG. 1 shows a clamping and lifting apparatus 1 according to the state of the art, as used in known fashion on multi-rope Koepe hoisting installations, in order to be able to simultaneously clamp and hold, lift or lower all ropes of a cageway without complex preparation. The clamping and lifting apparatus 1 comprises an upper clamping bar 18 and a lower clamping bar 19, on which respectively hydraulically operated clamping cylinders 17 are arranged. Whereas the lower clamping bar 19 is arranged in stationary fashion, the upper clamping bar 18 is configured to be mobile and is thus responsible for lifting and lowering loads. The upper clamping bar 18 therein is attached movably to the apparatus 1 via at least one master cylinder 2 and at least one slave cylinder 3. The at least one master cylinder 2 and the at least one slave cylinder 3 are for example configured as lifting cylinders in each case.

Figure 2:
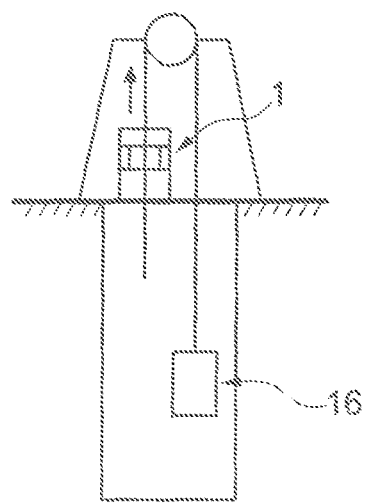
FIG. 2 the clamping and lifting apparatus in operation with a load from above in connection with an upward movement, FIG. 3 the clamping and lifting apparatus in operation with a load from below in connection with a downward movement.

FIG. 2 shows a clamping and lifting apparatus 1 in operation. The load 16 here acts in pulling fashion on the clamping and lifting apparatus, i.e. the load direction is upward. The clamping and lifting apparatus 1 is brought into position before starting operation, and the master cylinders 2 and slave cylinders 3 are initially driven to the very bottom. Now the clamping cylinders 17 of the lower clamping bar 19 are closed and for example the counterweight is removed. The complete weight of the load 16 is how held by the lower clamping bar 19. Subsequently also the clamping cylinders 17 of the upper clamping bar 18 that is disposed in the lower movement position are closed. Only when this process has been concluded are the clamping cylinders 17 of the lower clamping bar 19 released. The clamping and lifting apparatus 1 is now ready for the upward journey with the load 16.

In the method, during the upward journey of the upper clamping bar 18 with the load 16, a hydraulic fluid is fed by a pumping device 5 via a valve device 6 into the opening of a cylinder chamber 4 to be filled. The valve device 6 is for example a valve that can control both the fed volume flow and the discharged volume flow; this takes place for example by means of a linear, proportional control relation between the entry and the exit side. The valve device 6 of the cylinder chamber being filled, in this case the lower cylinder chamber 4 of the master cylinder 2 and the slave cylinder 3 is opened in order to let a volume flow of hydraulic fluid flow into the corresponding cylinder chamber 4. In order for the upper clamping bar 18 now to move upward at all, the valve device 6 of the cylinder chamber to be emptied, in this case the upper cylinder chamber 4 of the master cylinder 2 and the slave cylinder 3, is opened. Since an upward journey of the upper clamping bar 18 with load 16 takes place here, the force of weight of the load 16 also acts on the master cylinder 2 and the slave cylinders 3. This has a direct load-dependent influence on the discharged volume flow of the hydraulic fluid, for example hydraulic oil.

However, since the current speed 11 of the master cylinder 2 during the upward journey of the upper clamping bar 18 with load 16 becomes too high, by the load 16 the hydraulic fluid is pushed too quickly out of the cylinder chamber 4 to be emptied, in this case the upper cylinder chamber 4. A sufficient replenishing of a required volume flow of hydraulic fluid into the cylinder chamber 4 to be filled of the master cylinder 2 cannot be ensured for this reason, since the pumping device 5 is configured to replenish the required amount of hydraulic fluid in the cylinder chamber to be filled only for a projected speed.

To ensure that the pumping device 5 is always able to feed the required volume flow to the cylinder chamber to be filled, the current speed 11 of the master cylinder 2 is controlled by the method of the invention. The current speed of the master cylinder 2 is determined by a speed sensor element 25 at any given time during the upward journey. This speed sensor element 25 can be configured as a travel measuring system 20, wherein the current speed 11 is determined on the basis of the change of travel of the travel measuring system 20 over the movement time. The method compares this current speed 11 of the master cylinder 2 to a target speed 10. While the method opens the valve device 6 of the cylinder chamber 4 to be filled, the method changes the degree of valve opening 7 of the valve device 6 of the cylinder chamber 4 being emptied such that the current speed 11 of the master cylinder 2 never exceeds a target speed 10. The degree of valve opening 7 of the valve device 6 of the cylinder chamber 4 being filled is coupled to the degree of valve opening 7 of the valve device 6 of the cylinder chamber 4 being emptied. The degree of valve opening 7 of the valve device 6 of the cylinder chamber 4 being filled and the degree of valve opening 7 of the valve device 6 of the cylinder chamber 4 being emptied are directly proportionally related to one another therein. The speed of the master cylinder 2 in the load direction is kept constant thereby and is never moved beyond a target speed. Therefore the pumping device 5 is always able to feed the required volume flow to the cylinder chamber 4 to be filled and to prevent a pressure loss (vacuum) there.

The result is that, after the operating procedure, when by closing the clamping cylinders 17 of the lower clamping bar 19 and by releasing the clamping cylinders 17 of the upper clamping bar 18, the load 16 is taken over completely again by the lower clamping bar 19, the master cylinder 2 does not drop down abruptly in order to compensate the vacuum.

In the method of the invention, the master cylinder 2 of the clamping and lifting apparatus 1 is controlled directly via the described speed regulation. The further cylinders of the clamping and lifting apparatus 1 serving to support the at least one master cylinder 2, the so-called slave cylinders 3, are in contrast not controlled directly by a speed regulation in the method, but by means of an indirect regulation, namely a readjustment. The method therein constantly determines the absolute movement position 12 of the at least one master cylinder 2. Again, this takes place via the travel measuring system 20, which continuously determines a movement position. The slave cylinders are substantially built up in the same fashion as the master cylinder 2, thus having at least two cylinder chambers 4, one to be filled and one to be emptied, and valve devices 6 respectively arranged on the chambers. In order for the pumping device 5 always to be able to feed the required volume flow to the cylinder chamber to be filled, the current movement position 13 of the slave cylinders 3 is coupled to the absolute movement position 12 of the master cylinder 2. The method compares the absolute movement position 12 of the master cylinder 2 to the current movement position 13 of the slave cylinders 3. The current movement position 13 of the slave cylinders 3 is determined via a position measuring sensor element 35. The position measuring sensor element 35 is configured as a position measuring system 30 which constantly determines the current position. In a further embodiment, the position measuring sensor element 35 can also be configured as a travel measuring system 20. While the method opens the valve device 6 of the cylinder chamber 4 to be filled, the method changes the degree of valve opening 7 of the valve device 6 of the cylinder chamber 4 being emptied in such a fashion that the current movement position 13 of the slave cylinders 3 is equal to the absolute movement position 12 of the master cylinder 2. The degree of valve opening 7 of the at least one further valve device 7 of the cylinder chamber 4 to be filled is coupled to the degree of valve opening 7 of the at least one further valve device 6 of the cylinder chamber 4 being emptied. When, like in FIG. 2, an upward journey takes place with a load 16, when a movement position 13 of the slave cylinders 3 deviates with reference to the absolute movement position 12 of the master cylinder 2, the method can so readjust said movement position 13 that a running ahead and a running behind of the slave cylinders 3 with reference to the master cylinder 2 is prevented, and a substantially constant speed of all cylinders 2 and 3 is thus adjusted. Thereby the upper clamping bar 18 can be kept in balance.

The method of the invention further comprises checking the pressure in the corresponding chambers of the cylinders. A current pressure value 14 is constantly determined in the at least two cylinder chambers 4 of the master cylinder 2 and the slave cylinders 3. The current pressure value 14 is determined with the aid of a pressure switch, with a digital switching point and an analog output value. This determined current pressure value 14 is continuously compared to a target pressure value 15. When a pressure drops exceedingly strongly, corresponding safety measures are triggered.

Figure 3:
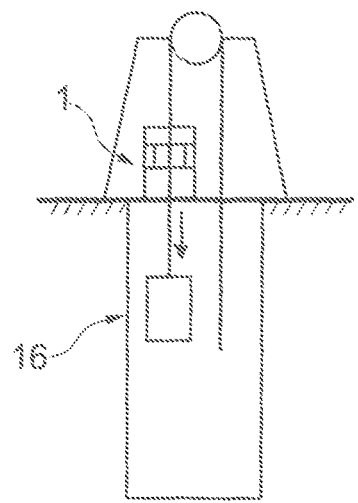

FIG. 2 describes, as described above, a critical operational state with a pulling load 16 from above, in connection with an upward movement of the upper clamping bar 18. Like FIG. 2, also FIG. 3 shows a critical operational state, but with a pulling load 16 from below, in connection with a downward movement of the upper clamping bar 18. It is possible in these operational states that the load 16 acting on the upper clamping bar 18 influences the clamping and lifting apparatus 1 such that the maximal speed is exceeded and the replenished amount of hydraulic fluid increases beyond the amount of hydraulic fluid required for such a fast movement. Fundamentally, it is applicable that in all four operational states, upward journey with load from below, upward journey with load from above, downward journey with load from above and downward journey with load from below, the direct and indirect regulation (speed regulation and readjustment) of the clamping and lifting apparatus 1 is active in accordance with the method of the invention. This means that the clamping and lifting apparatus 1 is moved at substantially constant speed independently of the load direction and/or the movement direction.

Figure 4:
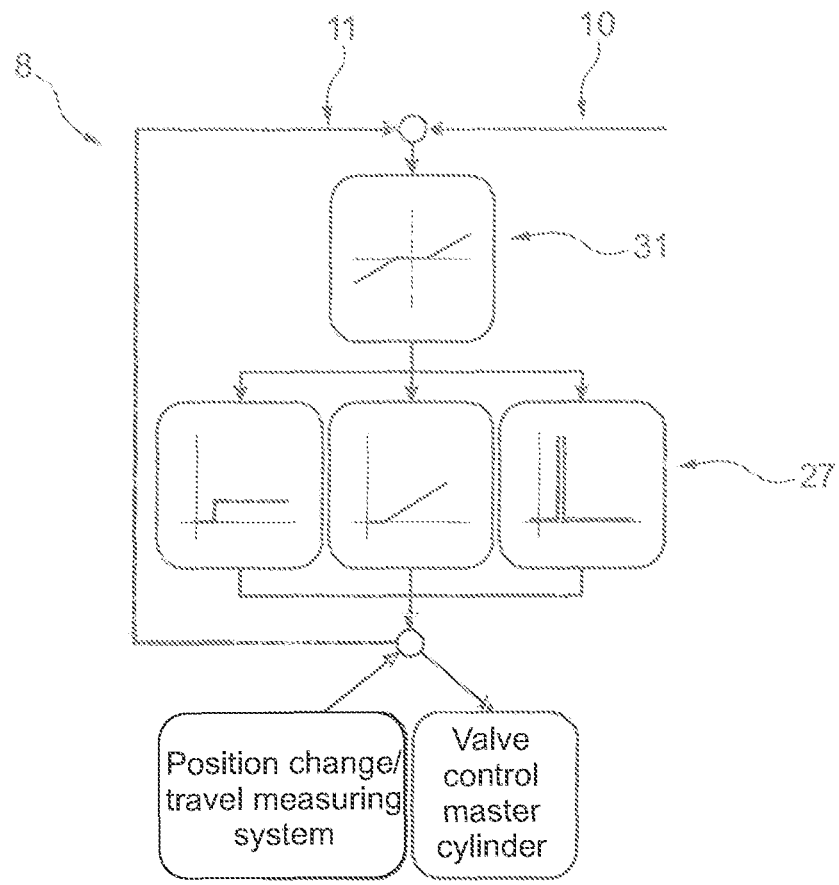
FIG. 4 shows a regulation apparatus.

FIG. 4 shows a regulation apparatus 8 for effecting a speed regulation of a clamping and lifting apparatus 1 with at least one master cylinder 2 and for effecting a readjustment (not shown) of the at least one slave cylinder 3 with reference to the at least one master cylinder 2. The current speed 11 of the master cylinder 2 is continuously determined by means of a speed sensor element 25 (not shown) during the lifting and lowering of the upper clamping bar 19. The speed sensor element 25 therein is configured as a travel measuring system 20, which accurately determines the current speed 11 on the basis of the change of travel/change of position over the movement time. The regulation apparatus 8 further comprises a controller 26, which is configured here for example as a PID controller 27, but can also be configured as a PI controller. For this PID controller 27 a dead zone 31 can be preset, in which the controller 26 remains inactive. The PID controller 27 decides on the suitable control mode by means of the computed current speed 11, the preset dead zone 31 and a target speed 10. When the system deviation does not remain within the dead zone 31, thus the current speed 11 deviates from the target speed 10 outside the dead zone 31, the PID controller 27 in the corresponding control mode activates via an actuator motor 28 the valve device 6 of the cylinder chamber 4 to be emptied of the master cylinder 2, in order to change the corresponding degree of valve opening 7 in such a fashion that the current speed 11 of the master cylinder 2 corresponds to the target speed 10. Simultaneously, in this regulation step the valve device 6 of the cylinder chamber 4 to be filled of the master cylinder 2 is opened by the controller 26 via the actuator motor 28, wherein the degree of valve opening 7 of the valve device 6 of the cylinder chamber 4 being filled and the degree of valve opening 7 of the valve device 6 of the cylinder chamber 4 being emptied are in a substantially directly proportional relationship to one another, which is derived by the controller 26. Thereby the master cylinder 2 in the clamping and lifting apparatus 1 can be operated at a constant speed without entering into a critical operational state.

Figure 5:
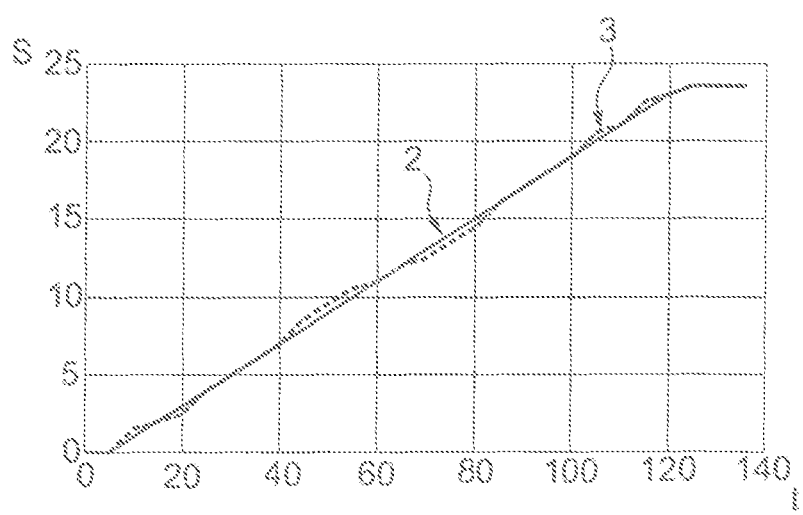
FIG. 5 shows the readjustment of the slave cylinder, wherein the movement position is represented as a function of the time.
Figure 6:
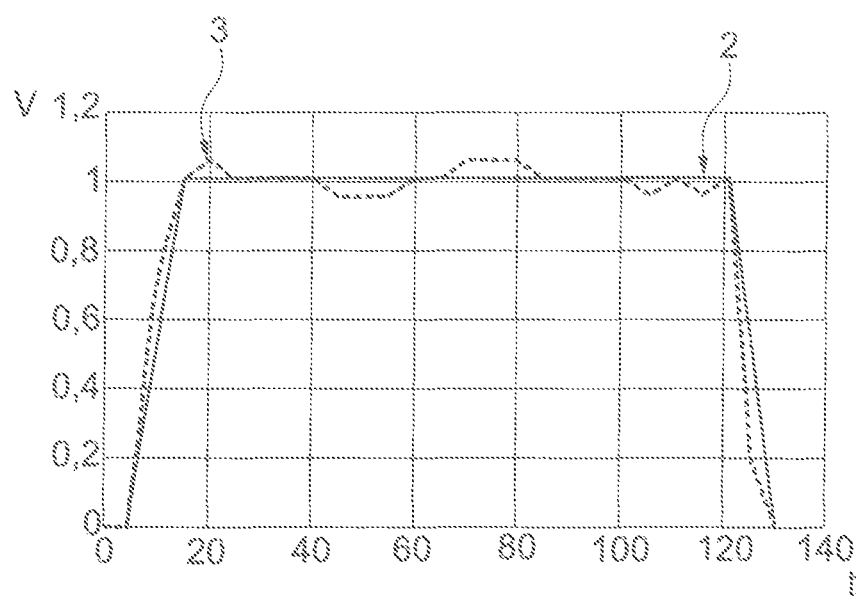
FIG. 6 shows the readjustment of the slave cylinder, wherein the speed is represented as a function of the time.

For effecting the readjustment of the at least one slave cylinder 3 with reference to the master cylinder 2, the regulation apparatus 8 has a position sensor element 35 (not shown), in order to determine the current movement position 13 or position change of the slave cylinder 3. The position sensor element 35 is configured as a position measuring system 30, which computes the current movement position 13 of the slave cylinder 3. In a further embodiment, the position measuring system 30 can be configured as a travel measuring system 20. As already described above, the absolute movement position 12 of the master cylinder 2 is constantly determined for speed regulation. Via a further controller (not shown), e.g. a PI controller or a PID controller 27, the regulation apparatus 8 constantly mutually aligns within a dead zone the determined positions of the master cylinder 2 and the slave cylinder 3, thus the absolute movement position 12 and the current movement position 13. When the system deviation does not remain within the dead zone 31, thus when the current movement position 13 of the slave cylinder 3 deviates outside of the dead zone 31 from the absolute movement position 11 of the master cylinder 2, the PI controller or the PID controller 27 in the corresponding control mode activates via a further actuator motor 28 the valve device 6 of the cylinder chamber 4 to be emptied of the slave cylinder 3. Thereby the corresponding degree of valve opening 7 of the cylinder chamber 4 to be emptied is changed, such that the current movement position 13 of the slave cylinder 3 corresponds to the absolute movement position 11 of the master cylinder 2. Simultaneously, in this regulation step the valve device 6 of the cylinder chamber 4 to be filled of the slave cylinder 2 is opened by the controller 26 via the actuator motor 28, wherein the degree of valve opening 7 of the valve device 6 of the cylinder chamber 4 being filled and the degree of valve opening 7 of the valve device 6 of the cylinder chamber 4 being emptied are in a substantially directly proportional relationship to one another, which is derived by the controller 26. In a further embodiment, the cylinder chamber 4 to be filled of the slave cylinder 3 can also be addressed upon readjustment also in the case of a system deviation, and the degree of valve opening of the corresponding valve device 6 can be changed in order to ensure a substantially identical movement position with reference to the master cylinder 2. By the indirect regulation in the form of the above-described readjustment, a possible running ahead or running behind of the slave cylinder with reference to the master cylinder is prevented. Thereby the absolute movement position and the absolute speed of all lifting cylinders 2 and 3 present in the clamping and lifting apparatus can be kept almost equal in order to keep the upper clamping bar 19 in balance. Due to this control sequence, upon readjustment, brief deviations of speed and thus deviations of movement position of the slave cylinder 3 can occur with reference to the master cylinder 2, as represented in FIGS. 5 and 6. While FIG. 5 shows the movement position of the slave cylinder upon readjustment as a function of the time, FIG. 6 shows the readjustment of the slave cylinder, wherein here the speed is represented as a function of the time.

In a further embodiment the regulation apparatus 8 comprises at least one pressure sensor element 29 (not represented in FIG. 4), in order to determine the current pressure value 14 in the respective cylinder chambers 4 of the master cylinder 2. In a further embodiment the regulation apparatus 8 comprises additional pressure sensor elements 29 in order to additionally determine the current pressure value 14 in the respective cylinder chambers 4 of the slave cylinder 3. These pressure sensor elements 29 are configured as pressure switches 40, depending on the embodiment. By means of the pressure switch 40 the current pressure value 14 in the chambers is determined with a digital switching point and an analog output value. In order to additionally increase the operational reliability of the clamping and lifting apparatus 1, the regulation apparatus 8 comprises a pressure controller 41 (not represented) in an embodiment. By means of the pressure controller 41, depending on the embodiment, the current pressure value 14 in the respective cylinder chambers 4 is compared to a target pressure value 15. When the current pressure value 14 deviates outside of a further dead zone, the degree of valve opening 7 of the valve device 6 of the cylinder chamber 4 to be filled or to be emptied of the master cylinder 2 or of the slave cylinder 3 is changed, if required, such that the target pressure value 15 is reached again in the cylinder chambers 4. In a further embodiment, further safety measures obvious to the person skilled in the art, such as switching off the installation, can be taken upon an exceedingly great pressure deviation, in order to ensure the operational safety of the installation.

LIST OF REFERENCE NUMBERS 1 clamping and lifting apparatus
2 master cylinder
3 slave cylinder
4 cylinder chamber
5 pumping device
6 valve device
7 degree of valve opening
8 regulation apparatus
9 hydraulic fluid
10 target speed
11 current speed
12 absolute movement position
13 current movement position
14 current pressure value
15 target pressure value
16 load
17 clamping cylinder
18 upper clamping bar
19 lower clamping bar
20 travel measuring system
25 speed sensor element
26 controller
27 PID controller
28 actuator motor
30 position measuring system
31 dead zone
35 position measuring sensor element
40 pressure switch
41 pressure controller

The invention claimed is:

1. A method for regulating a speed of a clamping and lifting apparatus with at least one master cylinder, wherein a hydraulic fluid can be fed and discharged through an opening in each case in at least two cylinder chambers of the at least one master cylinder via at least one pumping device and via at least one valve device per cylinder chamber for lifting and lowering loads, wherein a degree of valve opening of the respectively at least one valve device can be changed in dependence on the working direction of the apparatus, a target speed and a current speed of the at least one master cylinder, the method comprising:
- determining a working direction of the apparatus;
- determining a current speed of the at least one master cyclinder;
- comparing the current speed of the at least one master cyclinder to a target speed;
- opening the valve device of a cyclinder chamber being filled; and
- changing a degree of valve opening of the valve device of a cyclinder chamber being emptied when the current speed of the master cyclinder deviates from the target speed, wherein a degree of valve opening of the valve device of the cyclinder chamber being filled is coupled to the degree of valve opening of the valve device of the cyclinder chamber being emptied.

2. The method according to claim 1, wherein the current speed of the at least one master cylinder is determined on the basis of the change of travel of a travel measuring system over the movement time.

3. The method according to claim 1, wherein the clamping and lifting apparatus further comprises at least one slave cylinder, wherein for readjusting the at least one slave cylinder with reference to the at least one master cylinder the hydraulic fluid can be fed and discharged through an opening in each case in at least two cylinder chambers of the at least one slave cylinder via the at least one pumping device and via at least one further valve device per cylinder chamber for lifting and lowering loads, wherein a degree of valve opening of the respectively at least one further valve device can be changed in dependence on an absolute movement position of the at least one master cylinder and a current movement position of the at least one slave cylinder.

4. The method according claim 3, wherein the method comprises:
- determining an absolute movement position of the at least one master cylinder;
- determining a current movement position of the at least one slave cylinder;
- comparing the absolute movement position of the at least one master cylinder to the current movement position of the at least one slave cylinder;
- opening the valve device of the cylinder chamber being filled; and
- changing the degree of valve opening of the at least one further valve device of the cylinder chamber being emptied of the at least one slave cylinder when the current movement position of the at least one slave cylinder deviates from the absolute movement position of the at least one master cylinder, wherein the degree of valve opening of the at least one further valve device of the cylinder chamber being filled is coupled to the degree of valve opening of the at least one further valve device of the cylinder chamber being emptied.

5. The method according to claim 1, wherein the method further comprises:
- determining a current pressure value in the at least two cylinder chambers of the at least one master cylinder and/or of the at least one slave cylinder; and
- comparing the current pressure value to a target pressure value.

6. The method according to claim 5, wherein the current pressure value is determined with the aid of at last one pressure switch, with a digital switching point and an analog output value.

7. A regulation apparatus for effecting a method with the features of the claim 1, wherein the regulation apparatus for regulating a speed of a clamping and lifting apparatus with at least one master cylinder comprises:
- at least one speed sensor element, in order to determine a current speed of the at least one master cylinder;
- at least one controller, in order to compare the current speed of the at least one master cylinder to a target speed; and
- at least one actuator motor, in order to change a degree of valve opening of the at least one valve device per cylinder chamber of the at least one master cylinder when the current speed of the at least one master cylinder deviates from the target speed.

8. The regulation apparatus according to claim 7, wherein the at least one speed sensor element is configured as a travel measuring system, wherein the current speed of the at least one master cylinder is determined on the basis of a change of travel of the travel measuring system over the movement time.

9. The regulation apparatus according to claim 7, wherein the at least one controller is configured as at least one PI controller.

10. The regulation apparatus according to claim 7, wherein the regulation apparatus for readjusting at least one slave cylinder with reference to the at least one master cylinder in a clamping and lifting apparatus comprises:
- at least one position sensor element, in order to determine a current movement position of the at least one slave cylinder;
- at least one further controller, in order to compare an absolute movement position of the at least one master cylinder to the current movement position of the at least one slave cylinder; and
- at least one further actuator motor, in order to change the degree of valve opening of the at least one valve device per cylinder chamber of the at least one slave cylinder when the current movement position of the at least one slave cylinder deviates from the absolute movement position of the at least one master cylinder.

11. The regulation apparatus according to claim 10, wherein the at least one position sensor element is configured as a position measuring system.

12. The regulation apparatus according to claim 7, wherein the regulation apparatus comprises at least one pressure sensor element, in order to determine a current pressure value in the at least two cylinder chambers of the at least one master cylinder and/or of the at least one slave cylinder.

13. The regulation apparatus according to claim 12, wherein the at least one pressure sensor element is configured as a pressure switch, wherein the current pressure value is determined with a digital switching point and an analog output value.

14. The regulation apparatus according to claim 12, wherein the regulation apparatus comprises at least one pressure controller, in order to compare the current pressure value in the at least one master cylinder and/or in the at least one slave cylinder to a target pressure value.

* * * * *